US009126288B2

(12) United States Patent
Nagahori et al.

(10) Patent No.: US 9,126,288 B2
(45) Date of Patent: Sep. 8, 2015

(54) LASER CUTTING METHOD, LASER CUTTING NOZZLE, AND LASER CUTTING DEVICE

(75) Inventors: Masayuki Nagahori, Saitama (JP); Shinji Numata, Kawagoe (JP); Masafumi Itoyama, Fujimi (JP)

(73) Assignee: NISSAN TANAKA CORPORATION, Saitama (JP)

( * ) Notice: Subject to any disclaimer, the term of this patent is extended or adjusted under 35 U.S.C. 154(b) by 381 days.

(21) Appl. No.: 13/637,971

(22) PCT Filed: Feb. 21, 2011

(86) PCT No.: PCT/JP2011/053623
§ 371 (c)(1),
(2), (4) Date: Sep. 27, 2012

(87) PCT Pub. No.: WO2011/122159
PCT Pub. Date: Oct. 6, 2011

(65) Prior Publication Data
US 2013/0015168 A1 Jan. 17, 2013

(30) Foreign Application Priority Data

Mar. 29, 2010 (JP) ................. 2010-075744

(51) Int. Cl.
*B23K 26/00* (2014.01)
*B23K 26/38* (2014.01)
*B23K 26/14* (2014.01)

(52) U.S. Cl.
CPC ............... *B23K 26/38* (2013.01); *B23K 26/14* (2013.01); *B23K 26/1476* (2013.01); *B23K 26/1482* (2013.01); *B23K 2203/02* (2013.01)

(58) Field of Classification Search
USPC .......................... 219/121.6–121.86
See application file for complete search history.

(56) References Cited

U.S. PATENT DOCUMENTS 5,609,781 A * 3/1997 Kaga et al. ............... 219/121.84
5,818,009 A * 10/1998 Nakata et al. ............ 219/121.84

FOREIGN PATENT DOCUMENTS

| JP | 061900582 A | 7/1994 |
| JP | 07214368 A | 8/1995 |
| JP | 2003164984 A | 6/2003 |

OTHER PUBLICATIONS

International Search Report, PCT/JP2011/053623, dated May 24, 2011.

* cited by examiner

Primary Examiner — Sang Y Paik
(74) Attorney, Agent, or Firm — Nixon Peabody LLP

(57) ABSTRACT

A laser cutting nozzle configured such that a laser beam is irradiated through a nozzle hole formed in a nozzle main body from an opening of the nozzle hole, and an assist gas surrounding the laser beam is emitted. The nozzle hole includes a first control flow path, a second control flow path, and a third control flow path formed in a coaxial cylindrical shape, in sequence from upstream toward downstream in a flow direction of the assist gas. If a diameter of the first control flow path is $\phi A$, a diameter of the second control flow path is $\phi B$, and a diameter of the third control flow path is $\phi C$, an equation $\phi A < \phi C < \phi B$ is satisfied.

7 Claims, 5 Drawing Sheets

LASER CUTTING METHOD, LASER CUTTING NOZZLE, AND LASER CUTTING DEVICE

CROSS REFERENCE TO RELATED APPLICATIONS OR PRIORITY CLAIM

This application is a National Phase of PCT/JP2011/053623, filed Feb. 21, 2011, entitled, "LASER CUTTING METHOD, LASER CUTTING NOZZLE, AND LASER CUTTING DEVICE" which claims the benefit of Japanese Patent Application No. 2010-075744, filed Mar. 29, 2010, the contents of which are incorporated herein by reference in their entirety.

TECHNICAL FIELD

The prevent invention relates to a laser cutting method of cutting a workpiece by radiating a laser beam from an opening and spraying an assist gas surrounding the laser beam, a laser cutting nozzle and a laser cutting device.

BACKGROUND ART

As is well known, in a case of laser cutting a workpiece such as steel materials, cutting is performed as a laser beam irradiated from a laser oscillator is focused by a condenser lens, a cutting portion is heated, and an assist gas is sprayed from a nozzle so as to surround the laser beam to cover the cutting portion, so that combustion reaction occurs in the cutting portion, or cutting is performed as a metal melted by the laser is blown away.

Various technologies relating to a laser cutting nozzle used in the above laser cutting method have been disclosed to improve the processing efficiency (For example, see Patent Document 1).

FIG. 7 is a longitudinal cross-sectional view showing a laser cutting nozzle 100 in the related art. The laser cutting nozzle 100 is formed symmetrically with respect to an axis O of a nozzle main body 101, and a nozzle hole 102 is formed coaxially with the axis O.

Provided that an upstream side in a flow direction of an assist gas is referred to as a base end side and a downstream side is referred to as a front end side, the nozzle hole 102 has a tapered portion 103 whose diameter gradually decreases from a base end side of the nozzle main body 101 toward an opening 102A of a front end of the nozzle hole 102, a cylinder portion 104 connected to a front end side of the tapered portion 103, and a tapered portion 105 connected to a front end side of the cylinder portion 104 and having a diameter that gradually increases toward the opening 102A.

In addition, the base end side of the nozzle main body 101 is composed of a cylinder portion 108 in which a thread formed thereon for mounting on a laser cutting device is formed, a large-diameter portion 109 is formed on a front end side of the cylinder portion 108, and a tapered portion 110 whose diameter gradually decreases toward the opening 102A is formed on a front end side of the large-diameter portion 109.

By the configuration described above, the laser cutting nozzle 100 can perform the laser cutting efficiently.

PRIOR ART DOCUMENT

Patent Document

Patent Document 1: Japanese Patent Laid-Open Publication No. 1995-214368

SUMMARY OF THE INVENTION

Problems to be Solved by the Invention

However, in the case of cutting using the nozzle in the related art, if the roughness of the cutting plane is coarse, sometimes processing is necessary to reduce the surface roughness thereof after the workpiece is cut. Therefore, a laser cutting technology for reducing the surface roughness of the cutting plane becomes necessary.

In consideration of the above-mentioned circumstances, an object of the present invention is to provide a laser cutting method, a laser cutting nozzle and a laser cutting device which, when a workpiece is cut by a laser, makes the surface roughness of the workpiece small by suppressing the occurrence of cutting flaws on a cutting plane.

Means for Solving the Problem

In order to accomplish the above object, the present invention proposes the following configuration.

According to a first aspect of the present invention, a laser cutting nozzle is configured such that a laser beam is irradiated through a nozzle hole formed in a nozzle main body from an opening of the nozzle hole, and an assist gas surrounding the laser beam is emitted. In addition, the nozzle hole includes a first control flow path, a second control flow path, and a third control flow path formed in sequence from the upstream toward the downstream in a flow direction of the assist gas. In addition, the first control flow path is connected to the second control flow path expanded to an outer peripheral side thereof, and the second control flow path is connected to the third control flow path reduced to an inner peripheral side thereof.

According to a second aspect of the present invention, in the laser cutting nozzle according to the first aspect of the present invention, the first control flow path, the second control flow path, and the third control flow path are each formed in a cylindrical shape and arranged coaxially, and when a diameter of the first control flow path is $\phi A$, a diameter of the second control flow path is $\phi B$, and a diameter of the third control flow path is $\phi C$, the equation $\phi A < \phi C < \phi B$ is satisfied.

In accordance with the laser cutting nozzle according to the above invention, the surface roughness of the cutting plane becomes small in a simple configuration.

According to a third aspect of the present invention, in the laser cutting nozzle according to the second aspect of the present invention, a relation $\phi A : \phi C = 1 : 1.3 - 3.0$ is satisfied.

In accordance with the laser cutting nozzle according to the above invention, the surface roughness of the cutting plane efficiently becomes small.

According to a fourth aspect of the present invention, in the laser cutting nozzle according to the third aspect of the present invention, a relation $\phi C : \phi B = 1 : 1.1 - 3.0$ is satisfied.

In accordance with the laser cutting nozzle according to the above invention, the surface roughness of the cutting plane becomes stably small. In other words, if $\phi C : \phi B = 1 : 1.1 - 3.0$, when the value of $\phi B / \phi C$ is 1.1 or more, the surface roughness of the cutting plane becomes stably small.

As a result of a cutting test, the upper limit value of $\phi B / \phi C$ is not particularly limited. However, if the value of $\phi B / \phi C$ is 3.0 or less, the outer shape of the laser cutting nozzle is prevented from being too much larger, and thus it is easy to handle the nozzle.

According to a fifth aspect of the present invention, in the laser cutting nozzle according to the third or fourth aspect of the present invention, if L2 is a control flow path length of the second control flow path, and L3 is a control flow path length of the third control flow path, the equation L2+L3≥2.0×φA is satisfied.

In accordance with the laser cutting nozzle according to the above invention, the equation L2+L3≥2.0×φA is satisfied. Therefore, the surface roughness of the cutting plane becomes efficiently small.

According to a sixth aspect of the present invention, a laser cutting device includes the laser cutting nozzle according to any one of the first to fifth aspects of the present invention.

According to a seventh aspect of the present invention, there is provided a laser cutting method of cutting a workpiece by irradiating a laser beam from an opening of a nozzle hole formed in a nozzle main body, and emitting an assist gas surrounding the laser beam. In addition, when the assist gas is sprayed from the opening through the nozzle hole, the assist gas passes sequentially through a first control flow path formed in the nozzle hole, a second control flow path connected to the first control flow path and expanded to an outer peripheral side thereof, and a third control flow path connected to the second control flow path and reduced to an inner peripheral side thereof.

In accordance with the laser cutting nozzle, the laser cutting device, and the laser cutting method according to the above invention, the surface roughness of the cutting plane becomes small.

Effect of the Invention

In accordance with the laser cutting nozzle, the laser cutting device, and the laser cutting method according to the present invention, the surface roughness of the cutting plane becomes small.

MODES FOR CARRYING OUT THE INVENTION

Hereinafter, a first embodiment of the present invention will be described in detail with reference to FIGS. 1 to 3.

Figure 1:
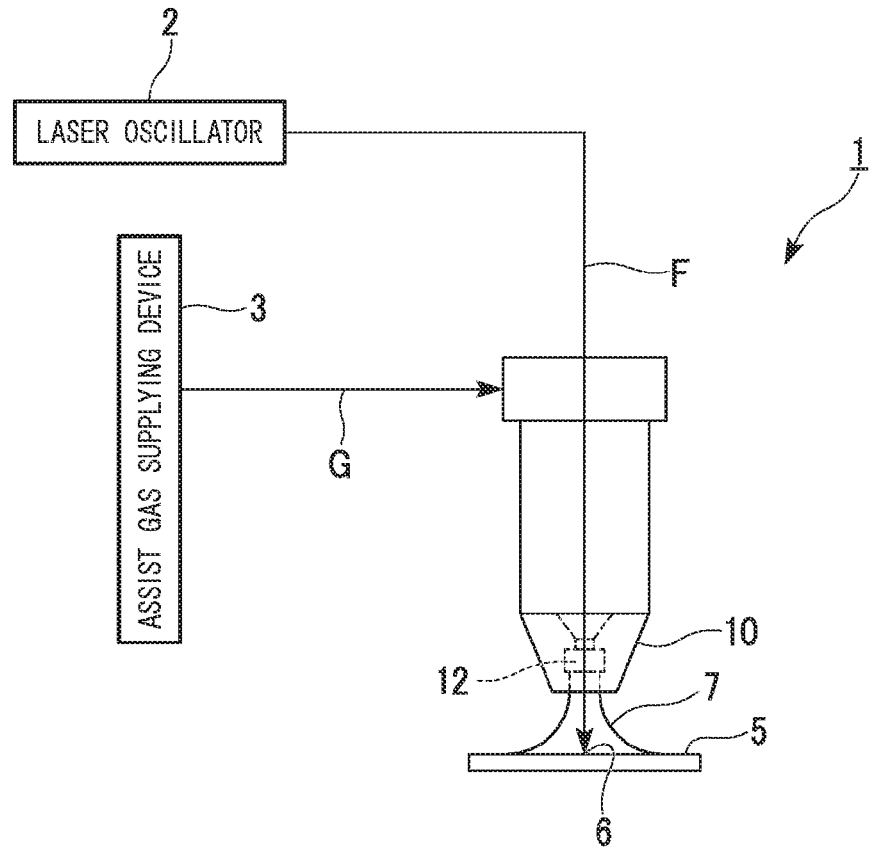
FIG. 1 is a schematic view showing a laser cutting device according to a first embodiment of the present invention.

FIG. 1 is a schematic view showing a laser cutting device according to the first embodiment. Reference numeral 1 denotes a laser cutting device, and reference numeral 10 denotes a laser cutting nozzle (hereinafter referred to in brief as a "nozzle").

The laser cutting device 1 includes the nozzle 10, a laser oscillator 2, and an assist gas supplying device 3. A laser beam F generated by the laser oscillator 2 is irradiated from a nozzle hole 12 of the nozzle 10, and an assist gas G supplied from the assist gas supplying device 3 is emitted from the nozzle hole 12 so as to surround the laser beam F.

The laser beam F irradiated from the nozzle hole 12 is focused on a cutting portion 6 of a workpiece 5. And, the assist gas G sprayed from the nozzle hole 12 flows so as to surround the laser beam F, and the cutting portion 6 is coated by an atmosphere 7 of the assist gas G. Then, cutting is performed as a combustion reaction occurs by the assist gas G in the cutting portion 6 heated by the laser beam F, or cutting is performed as a metal melted by the laser is blown away.

The assist gas supplying device 3 supplies the assist gas G, which is generated as a gas, for example, such as $O_2$, $N_2$, Ar, Air, or He and a gas selected from $H_2$ and He are mixed, to the nozzle 10 at a pressure of 0.01 to 3.0 MPa.

Figure 2:
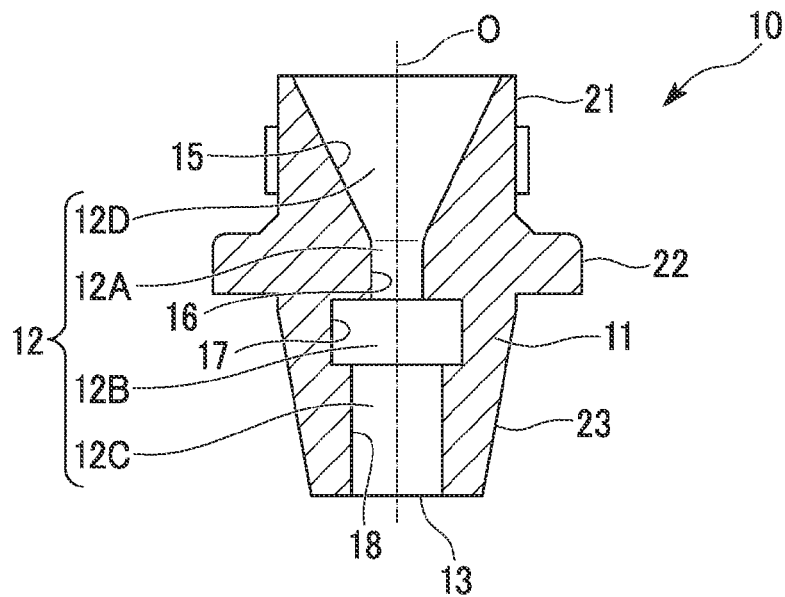
FIG. 2 is a longitudinal cross-sectional view illustrating a laser nozzle according to the first embodiment of the present invention.

FIG. 2 is a view schematically illustrating the nozzle 10.

A base end side of a nozzle main body 11 is composed of a cylinder portion 21 in which a thread formed thereon for mounting on the laser cutting device is formed, a large-diameter portion 22 is formed on a front end side of the cylinder portion 21, and the nozzle hole 12 is formed coaxially with an axis O, and has an outer shape in which a tapered portion 23 whose diameter gradually decreases toward an opening 13 is formed on a front end side of the large-diameter portion 22.

If the upstream side of the assist gas flow direction is a base end side and the downstream side thereof is a front end side, an assist gas inlet port 12D, a first control flow path 12A, a second control flow path 12B, and a third control flow path 12C are formed in sequence from the base end side.

The assist gas inlet port 12D, the first control flow path 12A, the second control flow path 12B, and the third control flow path 12C are formed coaxially with the axis O.

A front end side of the assist gas inlet port 12D is composed of a tapered wall portion 15, which is a part of a conical shape formed in a tapered shape whose diameter gradually decreases toward the first control flow path 12A.

The first control flow path 12A, the second control flow path 12B, and the third control flow path 12C are composed of cylinder wall portions 16, 17 and 18 that are parallel to the axis O. In addition, the control flow paths are connected through stepped portions perpendicular to the axis O, as shown in FIG. 3.

Figure 3:
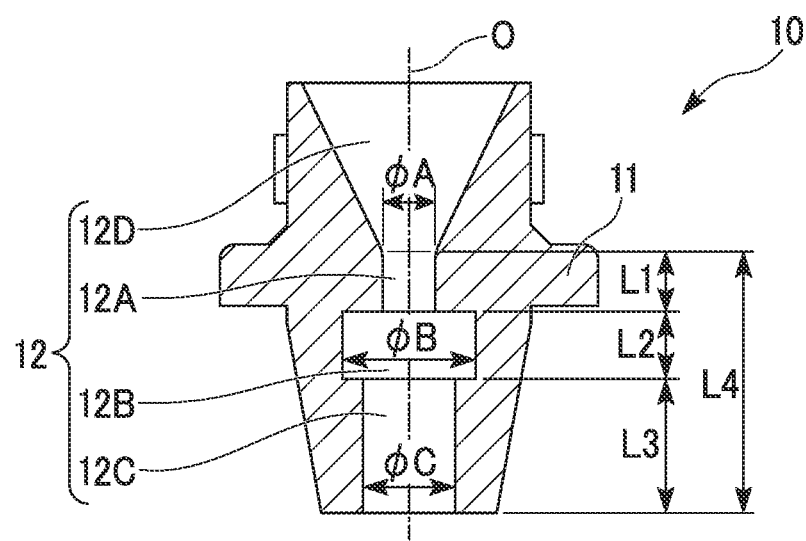
FIG. 3 is a longitudinal cross-sectional view schematically showing the laser nozzle according to the first embodiment of the present invention.

As shown in FIG. 3, if a control flow path length of the first control flow path 12A is L1, a diameter of the first control flow path 12A is φA, a control flow path length of the second control flow path 12B is L2, a diameter of the second control flow path 12B is φB, a control flow path length of the third control flow path 12C is L3 and a diameter of the third control flow path 12C is φC, the equation φA<φC<φB is satisfied.

In addition, it is preferable that relations of φA:φC=1:1.3–3.0, φC:φB=1:1.1–3.0, and L2+L3≥2.0×φA are satisfied.

Meanwhile, in order to prevent a phenomenon of the cutting efficiency being lowered because the laser beam interferes with a nozzle inner wall portion, it is more preferable that the equation 5.0≥(L2+L3)/φA is satisfied.

Next, the operation of the nozzle 10 will be described with reference to FIG. 4.

Figure 4:
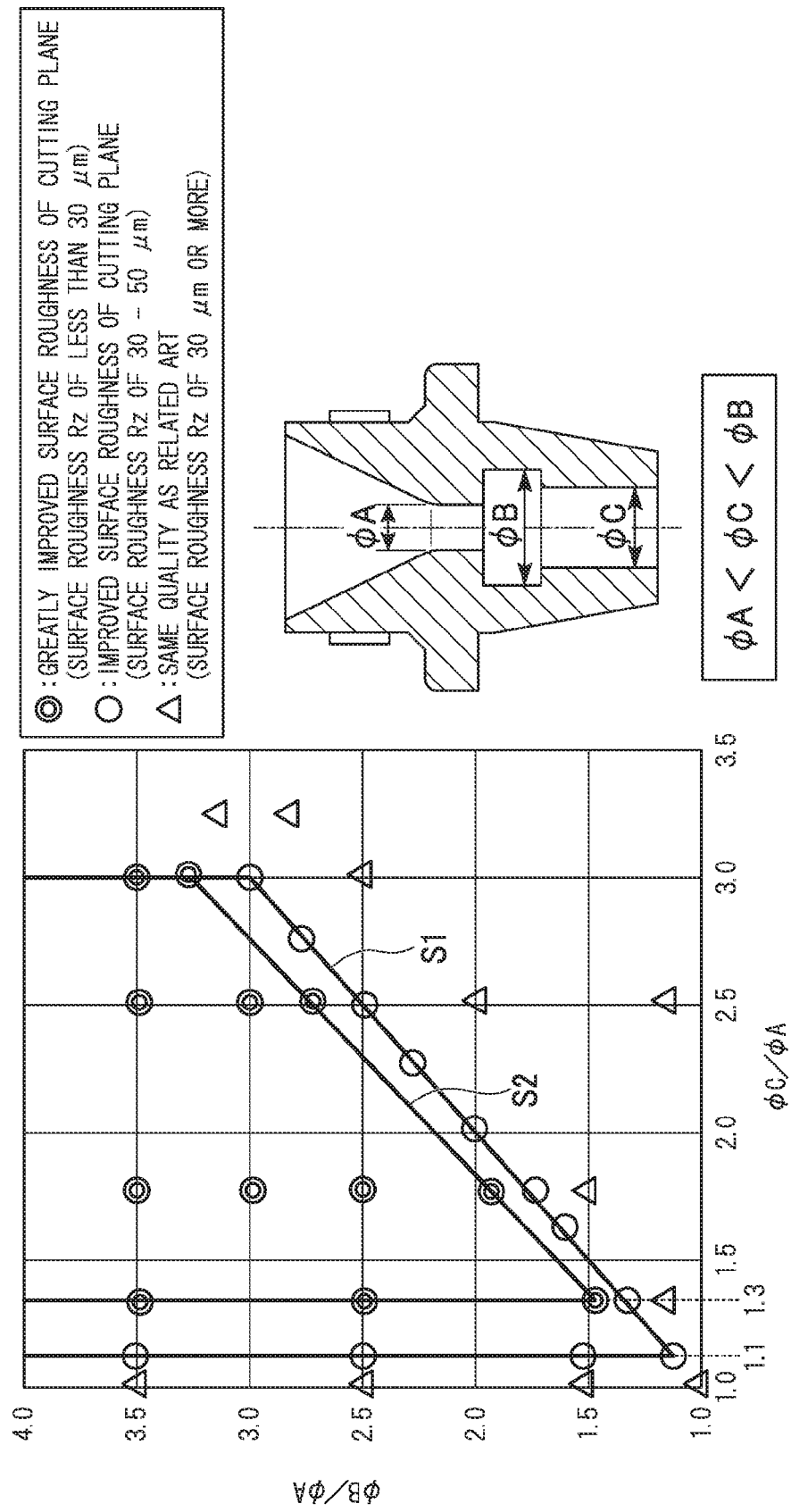
FIG. 4 is a view illustrating the effect of the laser nozzle according to the first embodiment of the present invention.

FIG. 4 is a graph showing a relation between the diameter φA of the first control flow path 12A, the diameter φB of the second control flow path 12B, the diameter φC of the third control flow path 12C and the surface roughness of the cutting plane, in the case of cutting stainless steel (a workpiece material) with plate thickness of 16 mm using the nozzle 10.

In the graph of FIG. 4, the horizontal axis shows φC/φA, and the vertical axis shows φB/φA. If the workpiece material is cut in the range where the pressure of the assist gas G is 0.5 MPa to 3.0 Pa, "Δ" shows the places, which the surface roughness Rz (JISB0601-1994) may become 50 μm or more, where it is the same level as the related art; "○" shows the places, which the surface roughness Rz may become 30 μm or more but less than 50 μm, where it is improved over the related art; and " " shows the places, which the surface roughness Rz may become less than 30 μm, where it is greatly improved over the related art.

From FIG. 4, the following can be confirmed.

(1) If $\phi C/\phi A=1.0$ and $\phi B/\phi A=1.0$, the nozzle in the related art in which $\phi A$, $\phi B$, and $\phi C$ are the same diameter is shown. In addition, the surface roughness of the cutting plane is naturally the same level as the related art (Δ).

(2) If $\phi B > \phi C$ ($=\phi B/\phi C>1.0$)), that is, if $\phi B/\phi A$ is above the straight line S1 and $\phi C/\phi A>1.0$, the surface roughness of the cutting plane becomes smaller than the nozzle in the related art.

Meanwhile, in FIG. 4, the quality level is not shown between $\phi C/\phi A=1.0-1.1$. However, in the case of $\phi C/\phi A>1.0$, the surface roughness of the cutting plane is improved as $\phi C/\phi A$ increases. Specifically, in the range of $\phi C/\phi A=1.0-1.1$, the surface roughness of the cutting plane is gradually reduced from the state of the quality (Δ) in the related art where Rz is 50 μm or more to the state (○) where the surface roughness Rz of the cutting plane is improved to 50-30 μm.

In the case of $\phi C/\phi A$ being 1.1–1.3, the surface roughness of the cutting plane is gradually reduced from the state (○) where the surface roughness Rz of the cutting plane is improved to 50-30 μm to the state ( ) where the surface roughness Rz of the cutting plane is greatly improved to 30 μm or less.

When $\phi C/\phi A>1.3$, the surface roughness of the cutting plane becomes the state ( ) where the surface roughness Rz of the cutting plane is greatly improved to 30 μm or less.

Meanwhile, through cutting experiments, it was confirmed that the surface roughness of the cutting plane was improved in the range of $\phi C/\phi A=1.0-3.0$.

(3) In the case of $\phi B > \phi C$ ($=\phi B/\phi C>1.3$)), that is, if $\phi B/\phi A$ is above the straight line S2 and $\phi C/\phi A>1.3$, the surface roughness of the cutting plane becomes the state ( ) where the surface roughness Rz of the cutting plane is greatly improved to 30 μm or less.

Next, the operation and effect of the nozzle 10 will be described with reference to FIG. 5.

Figure 5:
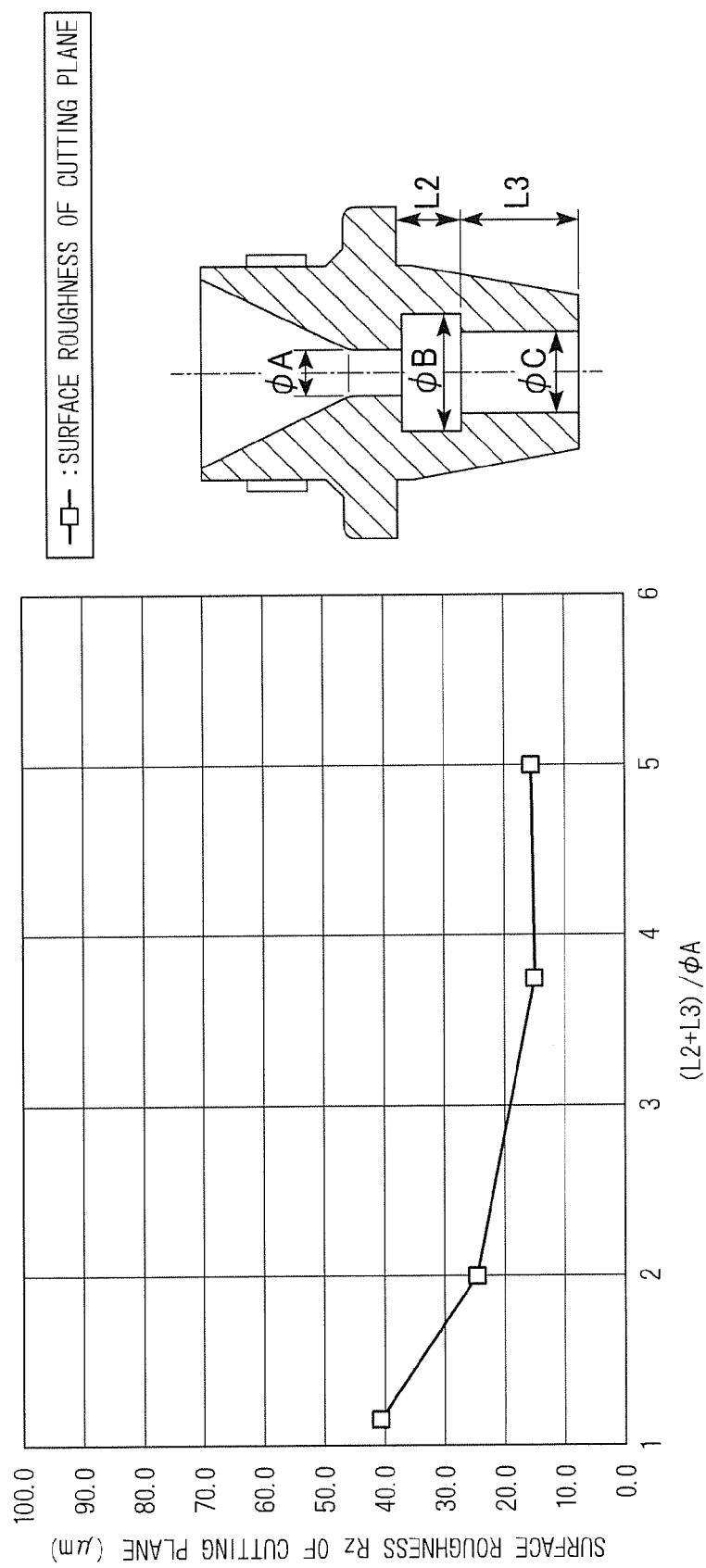
FIG. 5 is a view illustrating the effect of the laser nozzle according to the first embodiment of the present invention.

FIG. 5 is a graph showing a relation between the diameter $\phi A$ of the first control flow path 12A, the second control flow path length L2, the third control flow path length L3, and the surface roughness of the cutting plane (the cutting lower portion), in the case of cutting the stainless steel (the workpiece material) with plate thickness of 16 mm.

In FIG. 5, the horizontal axis shows $(L2+L3)/\phi A$, and the vertical axis shows the surface roughness of the cutting plane Rz (μm). And □ shows the maximum value of the surface roughness of the cutting plane that was cut in the state where the pressure of the assist gas G is 0.5 MPa to 3.0 Pa.

In this experiment, a nozzle in which the diameter $\phi A$ of the first control flow path 12A is 4 mm, the diameter $\phi B$ of the second control flow path 12B is 10 mm and the diameter $\phi C$ of the third control flow path 12C is 7 mm was used.

Meanwhile, the surface roughness of the cutting plane was evaluated in the range of $5.0 \geq (L2+L3)/\phi A$ where the laser beam is not interfered with by the nozzle inner wall portion.

The following can be confirmed from FIG. 5.

(1) The surface roughness of the cutting plane shows that it is better than the related art regardless of $(L2+L3)/\phi A$. As $(L2+L3)/\phi A$ increases, the surface roughness of the cutting plane is reduced, thereby improving the quality.

(2) In the case of $(L2+L3)/\phi A \geq 2.0$, a remarkably stable cutting plane is obtained.

As described above, by satisfying the equation $(L2+L3)/\phi A \geq 2.0$, the surface roughness Rz of 30 μm or less is stably secured.

As described above, according to the nozzle 10 and the laser cutting device 1, the surface roughness of the cutting plane in the laser cutting becomes small.

As a result, it is not necessary to perform a process for further reducing the surface roughness of the cutting plane after the laser cutting. Therefore, the number of processes at the time of the laser cutting decreases, so the cost is reduced.

According to the nozzle 10, even though the consumption of the assist gas G is the same as the consumption in the nozzle in the related art, the surface roughness becomes small.

In addition, by satisfying the equation $5.0 \geq (L2+L3)/\phi A$, interference between the irradiated laser beam F and the cylinder wall portions 16, 17 and 18 of the nozzle hole 12 is suppressed.

Next, a second embodiment of the present invention will be described with reference to FIG. 6.

Figure 6:
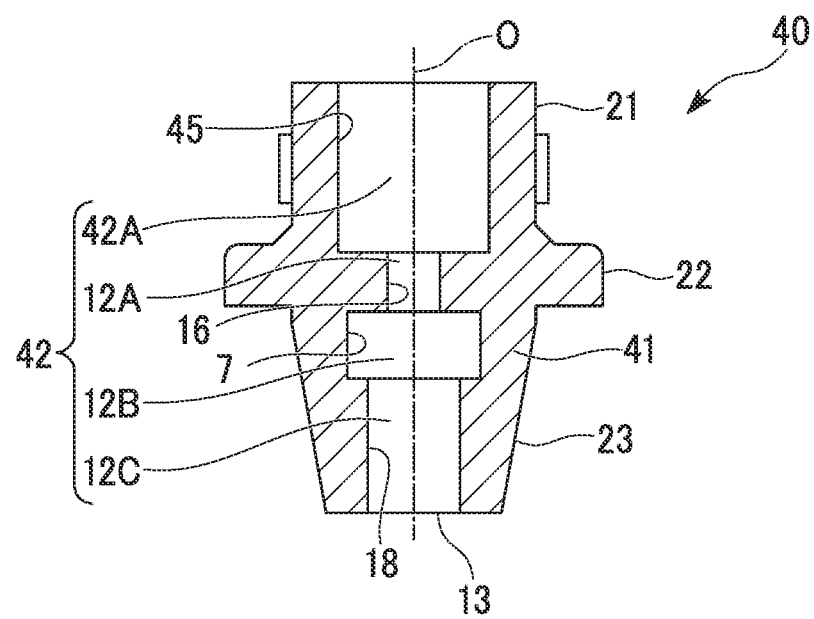
FIG. 6 is a longitudinal cross-sectional view illustrating a laser nozzle according to a second embodiment of the present invention.
Figure 7:
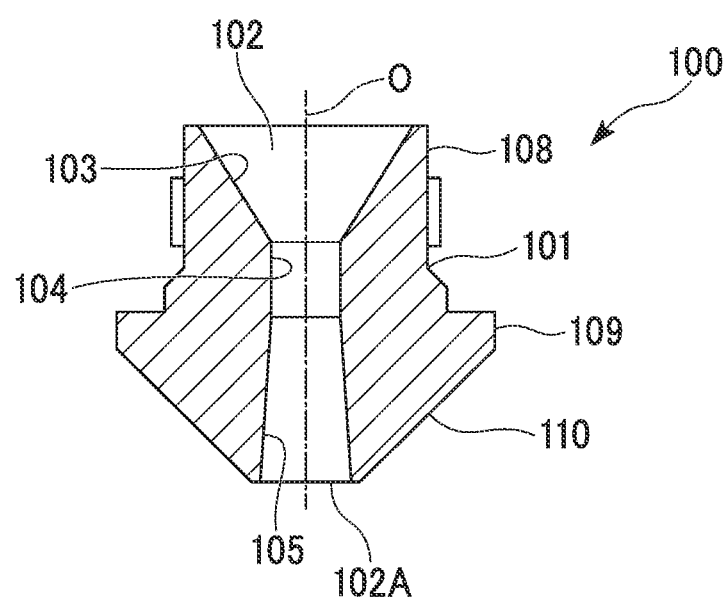
FIG. 7 is a longitudinal cross-sectional view schematically showing a laser nozzle in the related art.

FIG. 6 is a view showing a nozzle 40 according to the second embodiment. The nozzle 40 has the same shape as the nozzle main body 11. In a nozzle main body 41, a nozzle hole 42 is formed coaxially with the axis O.

The nozzle 40 is different from the nozzle 10 in that in the nozzle 40 is formed, instead of the assist gas inlet port 12D formed in a tapered shape in the nozzle 10, an assist gas inlet port 42A, for example, which is connected to the first control flow path 12A through a stepped portion formed by a surface perpendicular to the axis O. Other than that, it is the same as the first embodiment, so the same reference numerals are attached and description will be omitted. The assist gas inlet port 42A is composed of a cylinder wall portion 45 that is parallel with the axis O.

Same as the nozzle 10, if the control flow path length of the first control flow path 12A is L1, the diameter of the first control flow path 12A is $\phi A$, the control flow path length of the second control flow path 12B is L2, the diameter of the second control flow path 12B is $\phi B$, the third control flow path length of the third control flow path 12C is L3 and the diameter of the third control flow path 12C is $\phi C$, the equation $\phi A < \phi C < \phi B$ is satisfied.

Further, it is preferable that relations $\phi A:\phi C=1:1.3-3.0$, $\phi C:\phi B=1:1.1-3.0$, and the equation $L2+L3 \geq 2.0 \times \phi A$ are satisfied.

In order to prevent a phenomenon of the cutting efficiency being lowered by the laser beam being interfered with by the nozzle inner wall portion, it is more preferable that the equation $5.0 \geq (L2+L3)/\phi A$ is satisfied, as in the first embodiment.

Also in the case of using the nozzle 40, the same operation and effect are obtained as with the nozzle 10.

In addition, since the configuration of the nozzle 40 is simple, the nozzle 40 can be easily manufactured. Therefore, the manufacturing cost is reduced.

The present invention is not limited to the above embodiments, but various changes may be made without departing from the spirit of the present invention.

In the embodiments described above, for example, a case in which the assist gas inlet port 12D is configured by a part of a conical shape, and the assist gas inlet port 42A is configured in a cylindrical shape. However, the assist gas inlet ports 12D and 42A may be formed in other than the conical shape or a cylindrical shape. For example, instead of the assist gas inlet port 12D or the assist gas inlet port 42A, the inner wall surface of the assist gas inlet port may be formed as a curved surface of a hemispherical surface, a parabolic surface, or the like formed symmetrically about an axis corresponding to the axis of the nozzle bodies 11 and 41.

In addition, it may be a configuration in which an assist gas inlet port is formed in the nozzle mounting portion of the laser cutting device and an assist gas inlet port is not formed in the nozzle 10.

In the embodiments described above, the case in which the first control flow path 12A, the second control flow path 12B, and the third control flow path 12C are connected through the stepped portion perpendicular to the axis O. However, the first control flow path 12A, the second control flow path 12B, and the third control flow path 12C may be connected, for example, through an inclined plane with respect to the a plane perpendicular to the axis O with acceptable level.

In addition, in the embodiments described above, the case in which the first control flow path 12A, the second control flow path 12B, and the third control flow path 12C are composed of the cylinder wall portions 16, 17 and 18 coaxial with the axis O. However, instead of these cylinder wall portions 16, 17 and 18, any one or all of the first control flow path 12A, the second control flow path 12B, and the third control flow path 12C may be formed in a tapered shape wall portion, a barrel-shaped wall portion, a drum-shaped wall portion and the like, or other shape.

In addition, the cylinder wall portions 16, 17 and 18 may be formed in a shape of polygon or ellipse or a shape including these.

Any one or all of the first control flow path 12A, the second control flow path 12B, and the third control flow path 12C may be arranged in positions that are not coaxial with the axis O. For example, they may be arranged eccentrically with respect to the axis O.

The dimensional relations for the diameter and length of the first control flow path 12A, the second control flow path 12B, and the third control flow path 12C shown in the above embodiments may not satisfy the above-mentioned equations. For example, the relations and the equation are not limited to $\phi A:\phi C=1:1.3-3.0$, $\phi C:\phi B=1:1.1-3.0$, and $L2+L3 \geq 2.0 \times \phi A$. In other words, some or all of the above relations may not be satisfied.

The shape of the nozzles 10 and 40 may be any shape.

In the embodiments described above, the cases in which the assist gas inlet ports 12D and 42A for introducing the assist gas G to the nozzle holes 12 and 42 open on the base end sides of the nozzle bodies 11 and 41. However, the inlet of the assist gas G of the assist gas inlet ports 12D and 42A may be formed on side portions of the nozzle bodies 11 and 41.

INDUSTRIAL APPLICABILITY

According to the laser cutting nozzle, laser cutting device and laser cutting method according to the present invention, a cutting plane with a reduced surface roughness is obtained.

DESCRIPTION OF REFERENCE NUMERALS

F: laser beam
G: assist gas
O: axis
1: laser cutting device
5: workpiece
10, 40: nozzle (laser cutting nozzle)
11, 41: nozzle main body
12, 42: nozzle hole
12A: first control flow path
12B: second control flow path
12C: third control flow path
13: opening

The invention claimed is:

1. A laser cutting nozzle comprising:
a nozzle main body, wherein a nozzle hole formed in the nozzle main body, through which a laser beam is irradiated from an opening of the nozzle hole, and through which an assist gas surrounding an axis where the laser beam passes is emitted,
wherein the nozzle hole comprises a first control flow path, a second control flow path, and a third control flow path formed in sequence from an upstream toward a downstream in a flow direction of the assist gas,
wherein the first control flow path is formed of first wall portion parallel to the axis and is connected to the second control flow path through first stepped portion expanded to an outer peripheral side of the second control flow path provided in the downstream side of the first control flow path,
wherein the second control flow path is formed of second wall portion parallel to the axis and is connected to the third control flow path through second stepped portion reduced to an inner peripheral side of the third control flow path provided in the downstream side of the second control flow path, and
wherein the first control flow path, the second control flow path, and the third control flow path are each formed in a cylindrical shape and arranged coaxially, and when a diameter of the first control flow path is $\phi A$, a diameter of the second control flow path is $\phi B$, and a diameter of the third control flow path is $\phi C$, an equation $\phi A < \phi C < \phi B$ is satisfied.

2. The laser cutting nozzle according to claim 1, wherein a relation $\phi A:\phi C=1:1.3-3.0$ is satisfied.

3. The laser cutting nozzle according to claim 2, wherein a relation $\phi C:\phi B=1:1.1-3.0$ is satisfied.

4. The laser cutting nozzle according to claim 2, wherein, when L2 is a control flow path length of the second control flow path, and L3 is a control flow path length of the third control flow path, an equation $L2+L3 \geq 2.0 \times \phi A$ is satisfied.

5. A laser cutting device comprising the laser cutting nozzle according to claim 4.

6. A laser cutting device comprising the laser cutting nozzle according to claim 1.

7. A laser cutting method of cutting a workpiece comprising:
a step of irradiating a laser beam from an opening of a nozzle hole formed in a nozzle main body, and
a step of emitting an assist gas, surrounding an axis where the laser beam passes, from the opening of the nozzle hole,
wherein, in the step of emitting the assist gas in which the assist gas is sprayed from the opening through the nozzle hole, when the assist gas passes through the nozzle hole which includes a first control flow path formed of a wall portion parallel to the axis in the nozzle hole, a second control flow path provided in a downstream side of the first control flow path and connected to the first control flow path through first stepped portion expanded to an outer peripheral side of the second control flow path, and a third control flow path provided in the downstream side of the second control flow path and connected to the second control flow path through second stepped portion reduced to an inner peripheral side of the third control flow path, in which the first control flow path, the second control flow path, and the third control flow path are each formed in a cylindrical shape and arranged coaxially, and in which when a diameter of the first control flow path is ϕA, when a diameter of the second control flow path is ϕB, and when a diameter of the third control flow path is ϕC, an equation ϕA<ϕC<ϕB is satisfied, the assist gas passes sequentially through the first control flow path, the second control flow path and the third control flow path.

* * * * *